United States Patent
Kube et al.

(10) Patent No.: US 6,865,058 B2
(45) Date of Patent: Mar. 8, 2005

(54) LOAD BEAM ATTACHMENT TO ACTUATOR ARM

(75) Inventors: Todd Warren Kube, Boulder, CO (US); Alexander Wei Chang, Longmont, CO (US); Bruce Lynn Blakeslee, Golden, CO (US); Ernest Paul Lee, Boulder, CO (US); William Leon Rugg, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 154 days.

(21) Appl. No.: 10/176,324

(22) Filed: Jun. 20, 2002

(65) Prior Publication Data

US 2003/0086206 A1 May 8, 2003

Related U.S. Application Data

(60) Provisional application No. 60/333,025, filed on Nov. 5, 2001, and provisional application No. 60/332,299, filed on Nov. 15, 2001.

(51) Int. Cl.$^7$ ................................................ G11B 5/48
(52) U.S. Cl. ............................ 360/244.5; 360/245.8
(58) Field of Search ...................... 360/244.5, 244.6, 360/244.7, 264.2, 245.8

(56) References Cited

U.S. PATENT DOCUMENTS

| | | | |
|---|---|---|---|
| 4,761,699 A | 8/1988 | Ainslie et al. | |
| 4,789,914 A | 12/1988 | Ainslie et al. | |
| 4,853,811 A | 8/1989 | Brooks, Jr. et al. | |
| 4,870,525 A | 9/1989 | Wong et al. | |
| 4,875,117 A | 10/1989 | Slezak et al. | |
| 4,943,875 A | 7/1990 | Reidenbach et al. | |
| 4,949,194 A | 8/1990 | MacPherson et al. | |
| 5,055,969 A * | 10/1991 | Putnam ...................... 361/749 | |
| 5,103,359 A * | 4/1992 | Marazzo .................. 360/264.2 | |
| 5,140,482 A * | 8/1992 | Kimura et al. ........... 360/264.2 | |
| 5,225,949 A | 7/1993 | King et al. | |
| 5,291,360 A | 3/1994 | Foote | |
| 5,313,355 A | 5/1994 | Hagen | |
| 5,319,512 A | 6/1994 | Grapenthin | |
| 5,422,764 A * | 6/1995 | McIlvanie ................ 360/97.01 |
| 5,572,387 A * | 11/1996 | Brooks et al. ........... 360/244.3 |
| 5,604,649 A * | 2/1997 | Hernandez ............... 360/244.6 |
| 5,644,448 A * | 7/1997 | Suzuki ..................... 360/97.01 |
| 5,645,735 A | 7/1997 | Bennin et al. | |
| 5,677,815 A * | 10/1997 | Chan ....................... 360/265.7 |
| 5,710,682 A | 1/1998 | Arya et al. | |
| 5,715,117 A | 2/1998 | Brooks | |
| 5,717,549 A * | 2/1998 | Jurgenson ................ 360/266.1 |
| 5,731,932 A | 3/1998 | Crane | |
| 5,734,523 A | 3/1998 | Scheidecker et al. | |
| 5,759,418 A | 6/1998 | Frater et al. | |
| 5,768,062 A * | 6/1998 | Anderson et al. ........ 360/245.9 |
| 5,781,380 A | 7/1998 | Berding et al. | |
| 5,796,554 A | 8/1998 | Berding et al. | |
| 5,877,919 A | 3/1999 | Foisy et al. | |
| 5,956,211 A * | 9/1999 | Adley ...................... 360/244.1 |
| 6,049,443 A * | 4/2000 | Grill et al. ............... 360/244.8 |
| 6,098,271 A | 8/2000 | Yamamoto et al. | |
| 6,160,684 A | 12/2000 | Heist et al. | |
| 6,278,583 B1 * | 8/2001 | Adley ...................... 360/244.1 |
| 6,351,353 B1 | 2/2002 | Sluzewski et al. | |
| 6,392,844 B1 * | 5/2002 | Summers ................. 360/245.5 |
| 6,704,165 B2 * | 3/2004 | Kube et al. .............. 360/245.9 |
| 2002/0186508 A1 * | 12/2002 | Kube et al. .............. 360/245.9 |

FOREIGN PATENT DOCUMENTS

| | | | | |
|---|---|---|---|---|
| EP | 0 649 140 A2 | | 4/1995 | |
| JP | 03062368 A | * | 3/1991 | ........... G11B/21/02 |

* cited by examiner

*Primary Examiner*—Brian E. Miller
(74) *Attorney, Agent, or Firm*—Derek J. Berger (57) ABSTRACT

An actuator assembly includes a rotatable actuator arm mounted on the base of a disc drive. The actuator arm includes a metallic member seated on a non-metallic body. A proximal end of a load beam is mounted on the actuator arm and a distal end of the load beam supports a head. The actuator assembly also includes a connection between the metallic member and the load beam that secures the load beam to the actuator arm.

28 Claims, 8 Drawing Sheets

LOAD BEAM ATTACHMENT TO ACTUATOR ARM

RELATED APPLICATIONS

This application claims priority of U.S. provisional application Ser. No. 60/333,025, filed Nov. 5, 2001 and U.S. provisional application Ser. No. 60/332,299, filed Nov. 15, 2001.

FIELD OF THE INVENTION

This application relates generally to disc drives and more particularly to a load beam attachment to a circuit board actuator arm in a disc drive.

BACKGROUND OF THE INVENTION

A typical disc drive includes a base to which various components of the disc drive are mounted. The components include a spindle motor, which rotates one or more discs at a constant high speed. Information is written to and read from tracks on the discs through the use of an actuator assembly, which rotates during a seek operation about a bearing shaft assembly positioned adjacent the discs. The actuator assembly may include a plurality of actuator arms, which extend towards the discs, with one or more head gimbal assemblies extending from each of the actuator arms. Each head gimbal assembly includes a flexure or load beam and a head mounted at the distal end of the load beam. Each head includes an air bearing slider enabling the head to fly in close proximity above the corresponding surface of the associated disc. Head gimbal assemblies are typically attached to the corresponding metallic actuator arms by spot welding metallic plates to the load beams and then connecting the metallic plates to the actuator arms by swaging.

During a seek operation, the track position of the heads is controlled through the use of a voice coil motor, which typically includes a coil attached to the actuator assembly, as well as one or more permanent magnets, which establish a magnetic field in which the coil is immersed. Application of current to the coil causes the coil to move. As the coil moves, the actuator assembly pivots about the bearing shaft assembly, and the heads are caused to move across the surfaces of the discs.

A flex assembly provides the requisite electrical connection paths for the actuator assembly while allowing pivotal movement of the actuator assembly during operation. The flex assembly includes a printed circuit board to which head wires (not shown) are connected; the head wires being routed along the actuator arms and the load beams to the heads. The printed circuit board typically includes circuitry for controlling the write currents applied to the heads during a write operation and a preamplifier for amplifying read signals generated by the heads during a read operation.

The head wires, the printed circuit board, the actuator arms, and the coil are all separate parts that must be assembled during manufacturing of the disc drive. The assembly and the cost of manufacturing the separate components add to the overall cost of manufacturing the disc drive.

Additionally, vibrations in the disc drive, particularly in the actuator arms and the head gimbal assemblies, can have an adverse effect on drive reliability by creating unpredicted movement between the head and the disc. Such unpredicted movement can cause read/write errors. Additionally, such movement prevents narrower tracks from being used in disc drives, and thus limits the memory capability of the disc drive. To decrease the vibrations in the actuator arms, the arms are typically constructed with resonant frequencies that are well above the driving frequencies of the disc drive.

Accordingly, there is a need for a disc drive actuator assembly that decreases the costs of manufacture and that decreases vibrations of the actuator arms and head gimbal assemblies. The present invention provides a solution to these and other problems, and offers other advantages over the prior art.

SUMMARY OF THE INVENTION

Against this backdrop the present invention has been developed. One embodiment of the present invention may be summarized as an actuator assembly that includes a rotatable actuator arm mounted on the base of a disc drive. The actuator arm includes a metallic member seated on a non-metallic body. A proximal end of a load beam is mounted on the actuator arm and a distal end of the load beam supports a head. The actuator assembly also includes a connection between the metallic member and the load beam that secures the load beam to the actuator arm.

An alternative embodiment of the present invention may be summarized as a disc drive that includes an actuator assembly. The actuator assembly includes a rotatable actuator arm that includes a circuit board and a metallic pad formed on a distal end of the circuit board. A metallic load beam includes a proximal end mounted on the distal end of the circuit board and a distal end supporting a head. The actuator assembly further includes a metallic connection between the metallic pad and the load beam, the connection securing the load beam to the actuator arm.

These and various other features as well as advantages which characterize the present invention will be apparent from a reading of the following detailed description and a review of the associated drawings.

DETAILED DESCRIPTION

Figure 1:
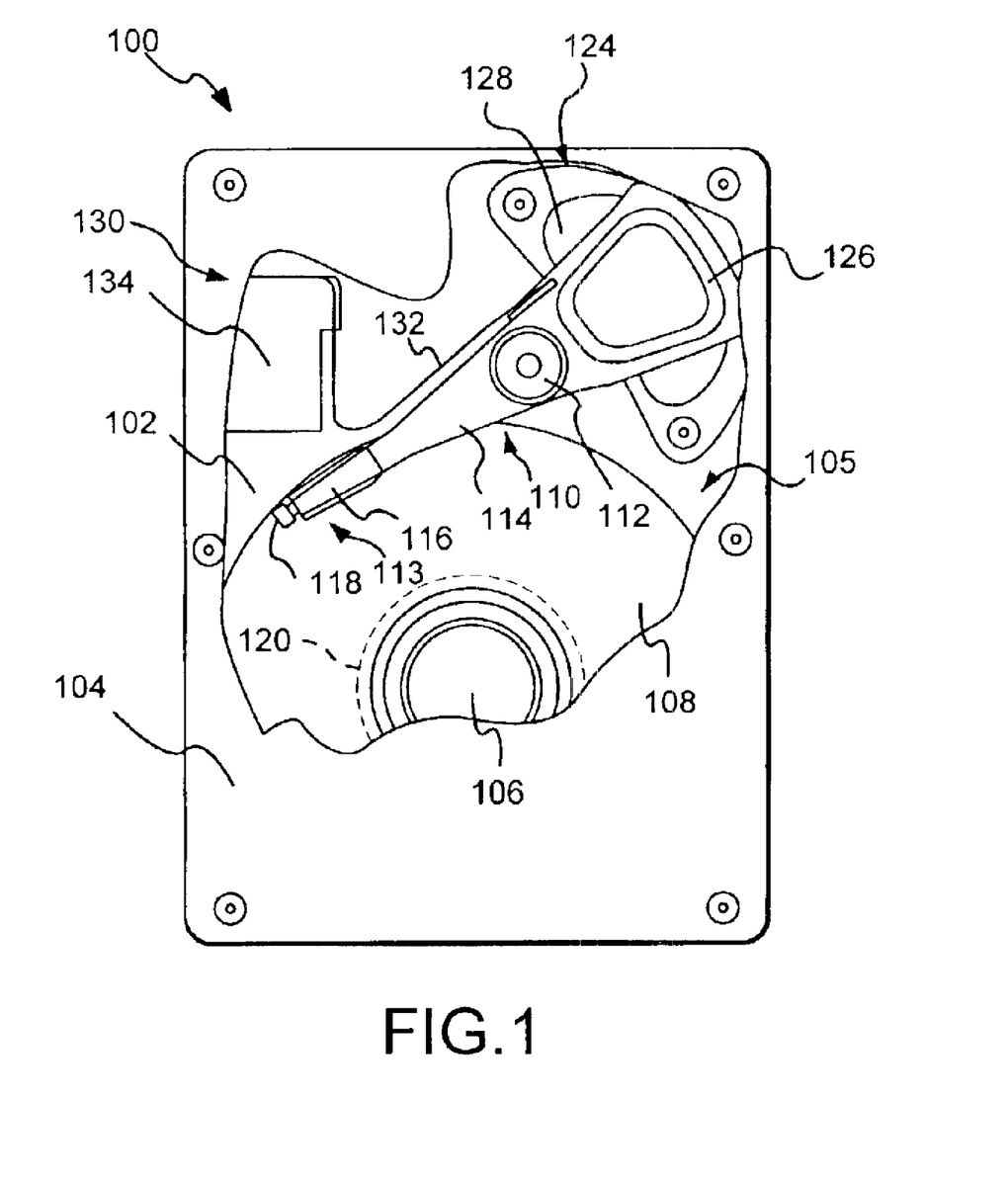
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes one or more printed circuit board actuator arms 114 which extend towards the discs 108, with one or more head gimbal assemblies 113 extending from each of the actuator arms 114. Each head gimbal assembly includes a flexure or load beam 116 and a head 118 mounted at the distal end of the load beam 116. Each arm 114 is a printed circuit board on which at least one head gimbal assembly is mounted. Each head 118 includes an air bearing slider enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128, which establish a magnetic field in which the coil 126 is immersed. Preferably, the coil 126 is formed as an integral part of at least one actuator arm 114. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board to which head wires (not shown) are connected; the head wires being routed along the actuator arms 114 and the load beams 116 to the heads 118. The actuator arms 114 preferably include circuitry for controlling the write currents applied to the heads 118 during a write operation and a preamplifier for amplifying read signals generated by the heads 118 during a read operation. Additionally, the portion of the head wires that are routed along the actuator arms 114 are preferably formed as an integral part of the circuit board actuator arms 114. The flex assembly includes a flex cable 132 that extends from the circuit board actuator arms 114 and terminates at a flex bracket 134. The flex bracket 134 communicates through the base deck 102 to a disc drive printed circuit board (not shown) mounted to the bottom side of the disc drive 100.

The actuator arm 114 thus preferably incorporates features of the flex assembly 130, the actuator assembly 110, and the voice coil motor 124 into a single part, thereby simplifying the process of manufacturing the disc drive 100. Additionally, while the resonant frequencies of the actuator arm 114 are lower than prior metallic actuator arms, the damping characteristics of the printed circuit board materials are greater than with metallic actuator arms. Thus, the actuator arm 114 is more effective in decreasing vibrations than conventional actuator arms. The actuator arm 114 is also preferably lighter than conventional metallic actuator arms and thus has a smaller moment of inertia. However, prior swaging methods of attaching head gimbal assemblies to metallic actuator arms are difficult to adapt to printed circuit board actuator arms having non-metallic bodies.

Figure 2:
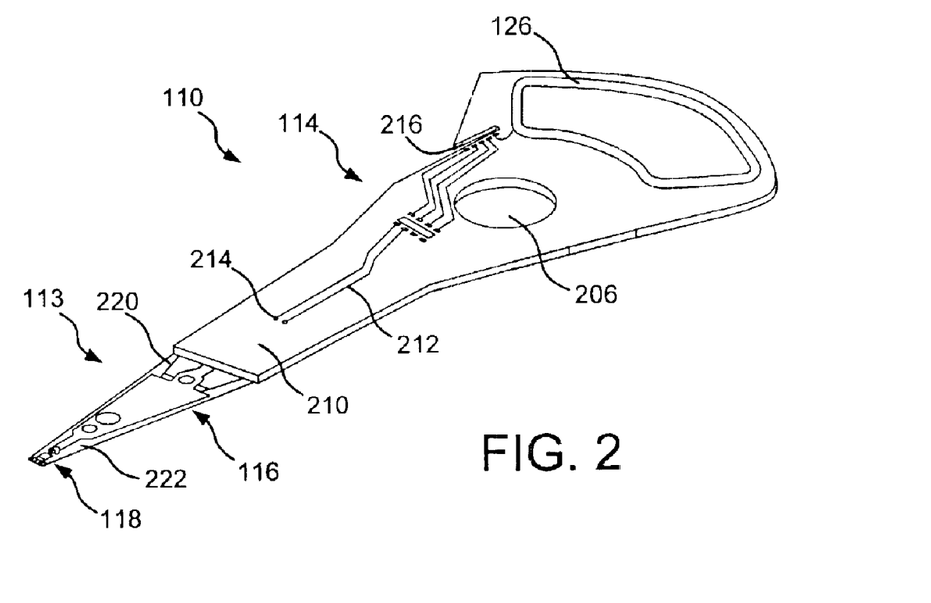
FIG. 2 is a perspective view of an actuator assembly according to an embodiment of the present invention.

Referring now to FIG. 2, an actuator assembly 110 includes a generally flat elongate actuator arm 114. The actuator arm 114 is a circuit board defining a centrally located hole 206 for mounting the actuator assembly 110 to the shaft assembly 112 of FIG. 1. Thus, the actuator arm 114 pivots about the hole 206. A voice coil 126 is integrated into the circuit board actuator arm 114 on one side of the hole 206, and on the opposite side of the hole 206 the actuator arm terminates at a distal end 210. The circuit board actuator arm 114 also preferably includes traces 212 and vias 214 to connect various electrical and electronic components that are mounted on or integrated within the actuator arm 114. A connection slot 216 adjacent the hole 206 extends into the actuator arm 114 and mates with an end of the flex cable 132 of FIG. 1 to connect the disc drive printed circuit board (not shown) with the actuator assembly 110 via the flex cable 132 and flex bracket 134 of FIG. 1.

A proximal end 220 of the load beam 116 is preferably mounted on the distal end 210 of the actuator arm 114. The load beam 116 extends from proximal end 220 to a distal end 222 that supports the head 118.

Figure 3:
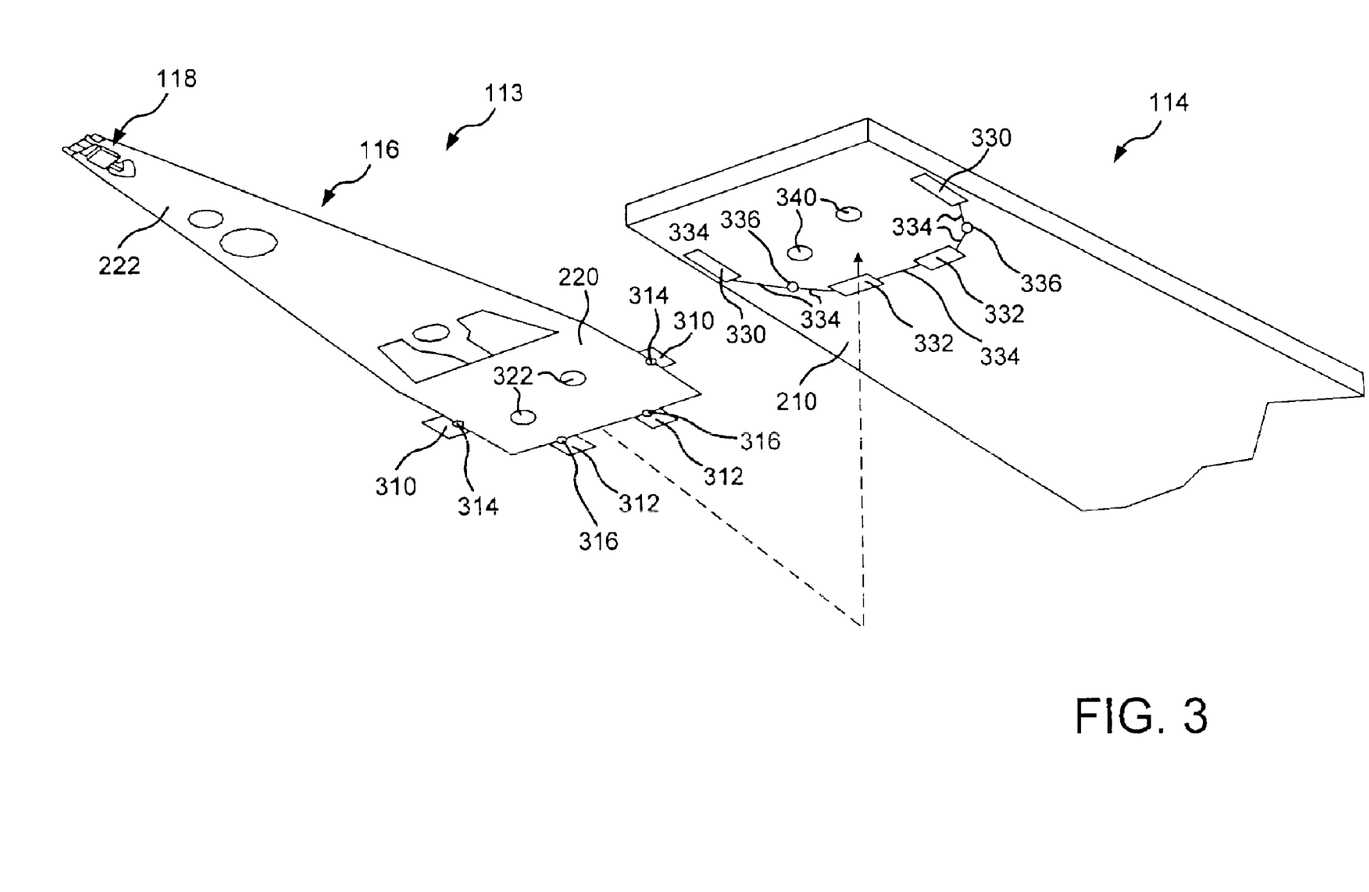
FIG. 3 is an exploded perspective view of a distal end of an actuator assembly, wherein the head gimbal assembly of the actuator assembly will be soldered to the actuator arm.
Figure 4:
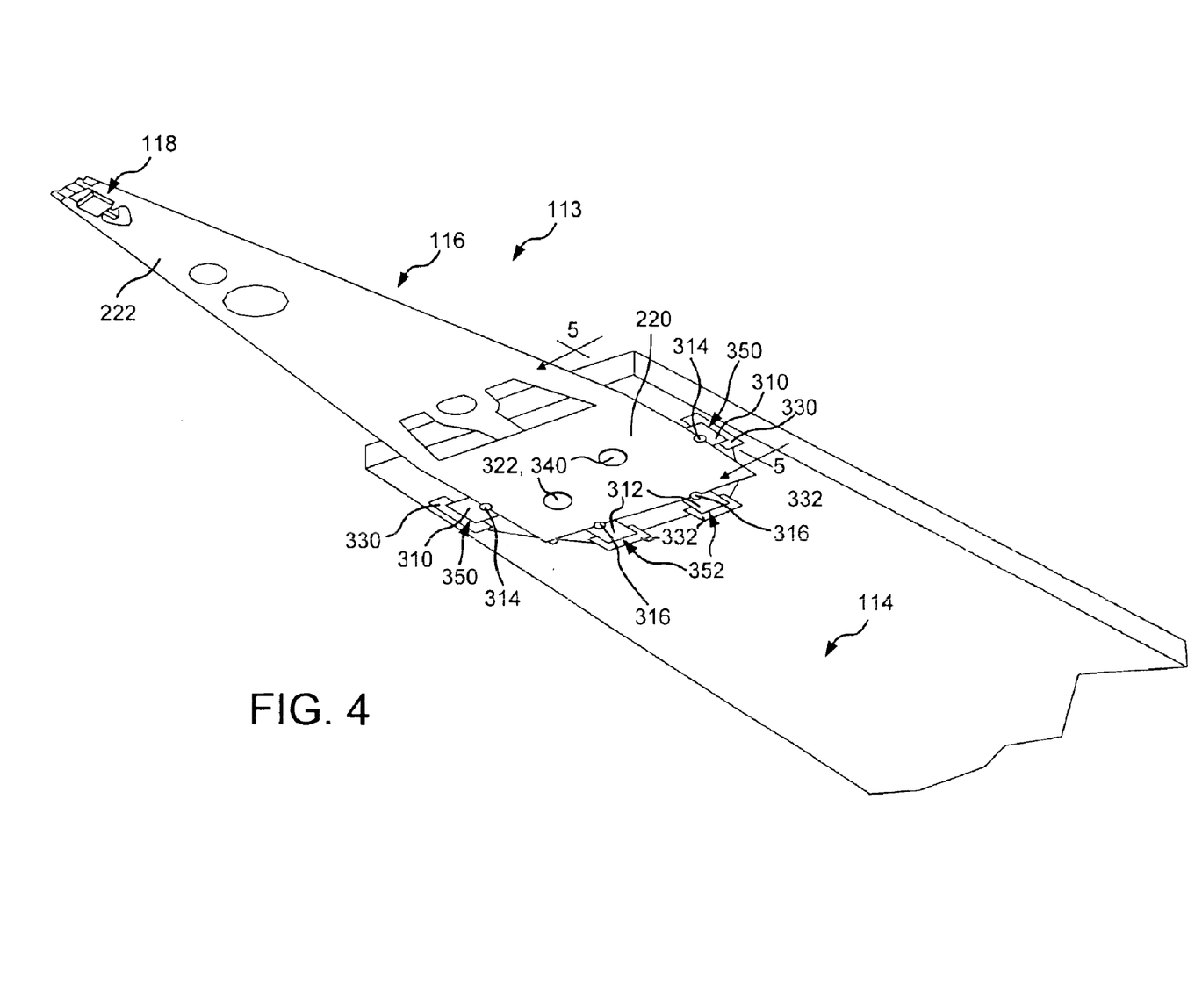
FIG. 4 is an assembled perspective view of the distal end of the actuator assembly shown in FIG. 3.

As shown in FIGS. 3–4, generally rectangular lateral tabs or ears 310 extend transversely from opposing sides of the proximal end 220. Also, a pair of generally rectangular longitudinal tabs 312 extend from the proximal end 220. The proximal end 220 defines a lateral thermal relief aperture 314 at the base of each lateral tab 310 and a longitudinal thermal relief aperture 316 at the base of each longitudinal tab 312.

Figure 5:
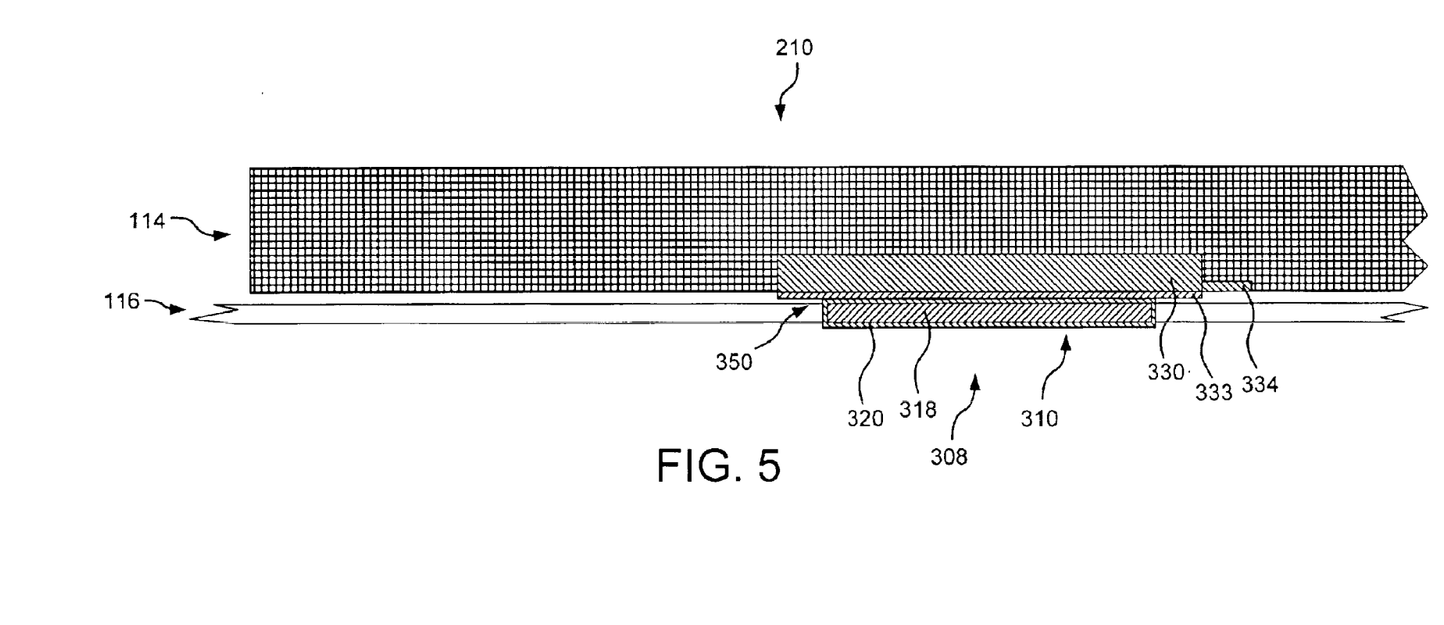
FIG. 5 is a sectional view taken along line 5—5 of FIG. 4.

As shown in FIG. 5, each tab 310, 312 preferably includes a tab body 318 comprised of the same material as the body of the load beam 116, which is preferably stainless steel. A plating 320 preferably surrounds the body 318, although it may be disposed on only the side that faces the actuator arm 114. The plating 320 is preferably comprised of a solderable material such as tin-lead, tin-lead-copper, silver-tin-copper, or gold. Referring back to FIGS. 3–4, the proximal end 220 also defines a pair of centrally located load beam alignment holes 322. The head gimbal assembly 113 may be manufactured according to known methods with an additional step of applying the plating 320 to the tabs 310, 312.

A pair of generally rectangular lateral members or pads 330 are formed on opposing sides of the distal end 210 of the actuator arm 114 facing the proximal end 220 of the load beam 116. A pair of generally rectangular longitudinal members or pads 332 are formed inwardly and proximally from the lateral pads 330. The pads 330 are preferably a solderable material that can be applied to a printed circuit board, such as copper or nickel plated copper. Solder 333 is deposited on each pad 330, 332 (see FIG. 5). Ground traces 334 are formed in the distal end 210 of the circuit board actuator arm 114, connecting the pads 330 and 332 to each other and to ground vias 336 located between the longitudinal pads 332 and the lateral pads 330. The ground vias 336 are grounded by way connections within the circuit board actuator arm 114. Thus, static electricity that builds up on the head 118 drains through the load beam 116, the ground traces 334, the ground vias 336 and through other connections and traces of the circuit board actuator arm 114. The distal end 210 of the actuator arm 114 preferably defines a pair of centrally located actuator arm alignment holes 340.

The actuator arm 114 can be manufactured according to known methods of manufacturing circuit boards. Thus, the materials used for the actuator arm 114 are preferably standard printed circuit board materials. The body of the actuator arm 114 is preferably made of reinforced fiberglass or plastic. The various components, such as the pads 330, 332 can be formed during the printed circuit board manufacturing process. Notably, the body of the actuator arm 114 could be a non-metallic material other than a circuit board material and could be made by processes other than circuit board manufacturing processes.

The head gimbal assembly 113 is preferably mounted by aligning the actuator arm alignment holes 340 with the load beam alignment holes 322 so that the lateral tabs 310 abut the solder 333 formed on the lateral pads 330 and the longitudinal tabs 312 abut the solder 333 formed on the longitudinal pads 332. The tabs 310, 312; the pads 330, 332; and the solder 333 are heated to form corresponding solder connections 350, 352, preferably with a hot bar, which also holds the actuator arm 114 and the load beam 116 together during heating. The thermal relief apertures 314 and 316 thermally isolate the tabs 310, 312 and thereby facilitate heating of the tabs 310, 312 without heating the entire load beam 116. The solder 333; the tabs 310, 312; and the pads 330, 332 are then allowed to cool, thereby solidifying the solder connections 350, 352. The head gimbal assembly 113 can be repositioned relative to the actuator arm 114 by applying heat to melt the solder connections 350, 352; repositioning the head gimbal assembly 113; and allowing the solder connections 350, 352 to cool.

Figure 6:
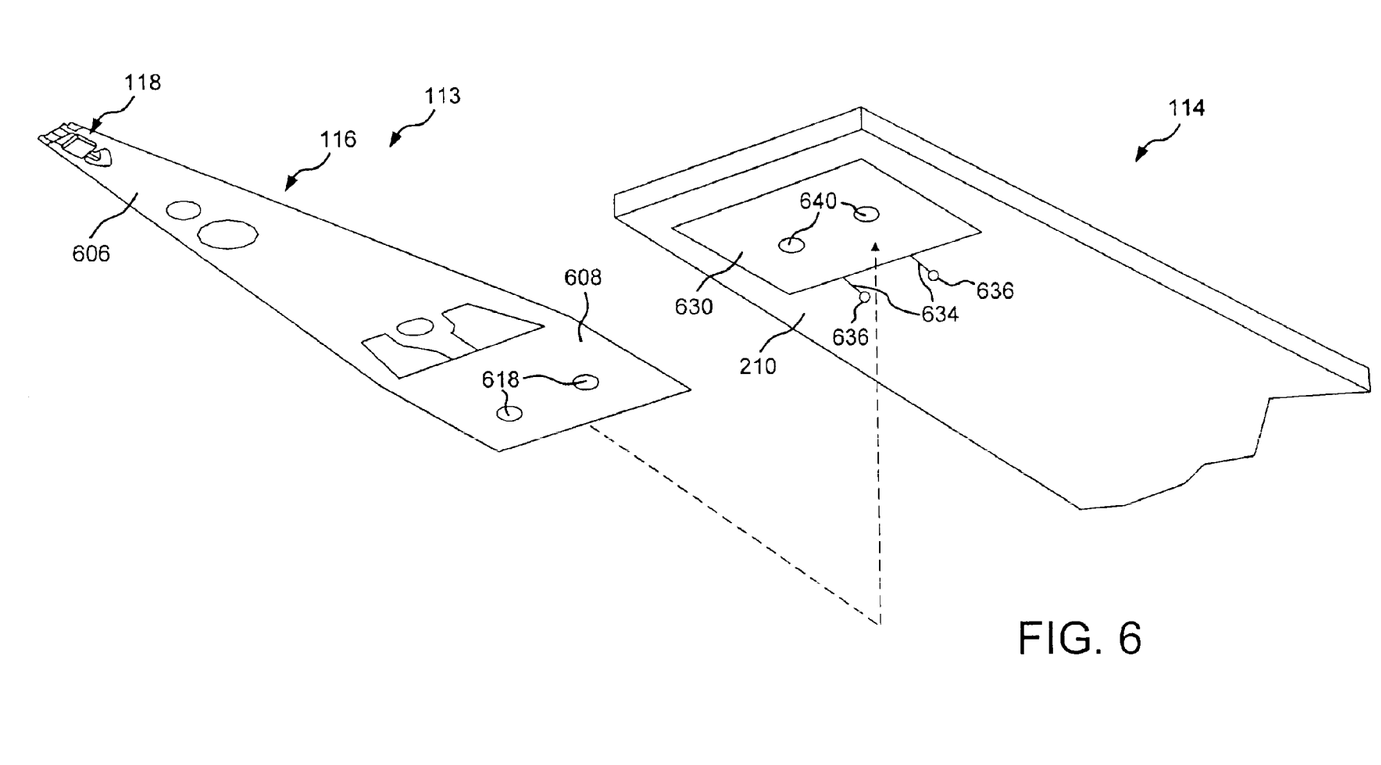
FIG. 6 is an exploded perspective view of a distal end of the actuator assembly, wherein the head gimbal assembly of the actuator assembly will be welded to the actuator arm.
Figure 7:
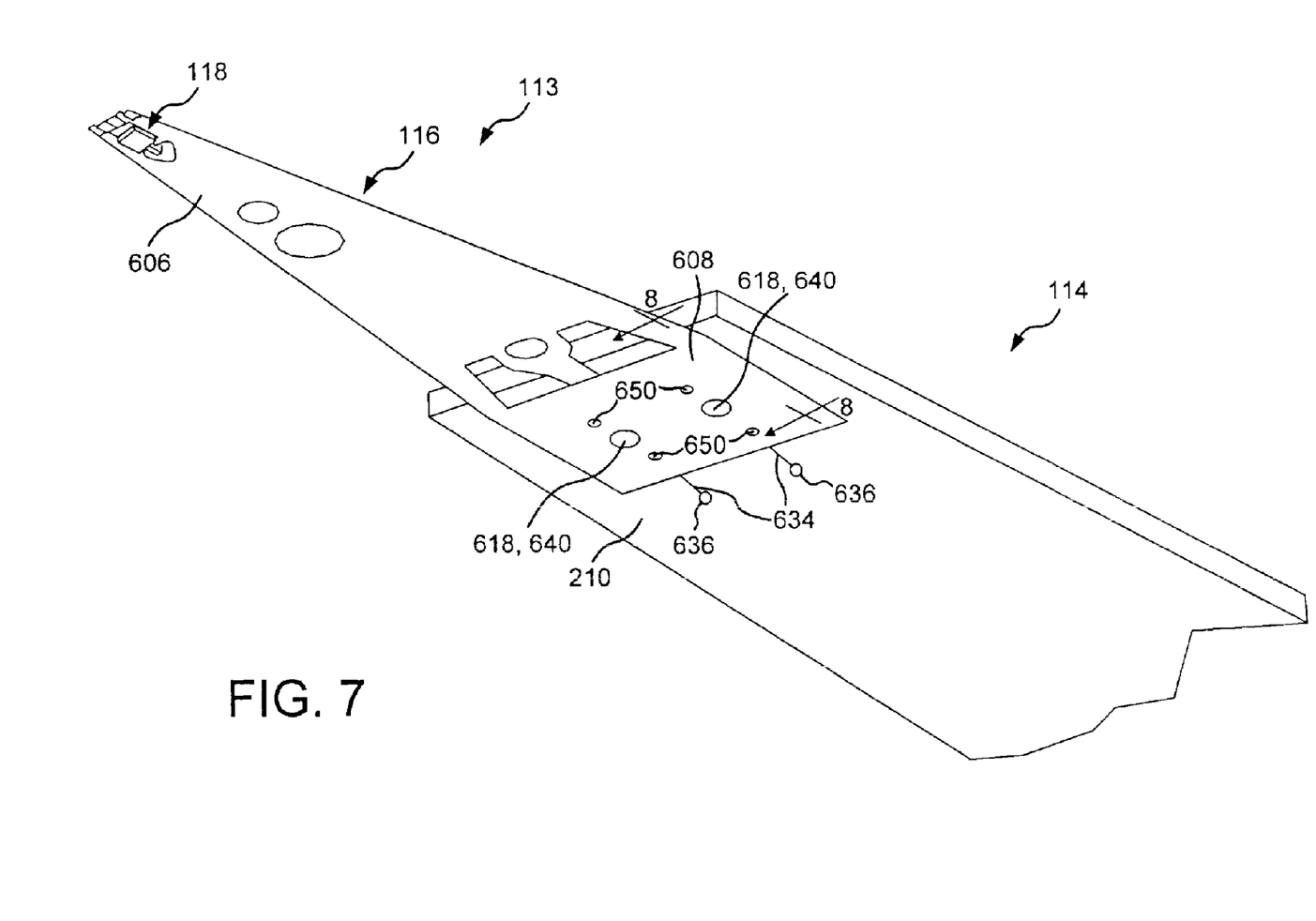
FIG. 7 is an assembled perspective view of the distal end of the actuator assembly shown in FIG. 6.
Figure 8:
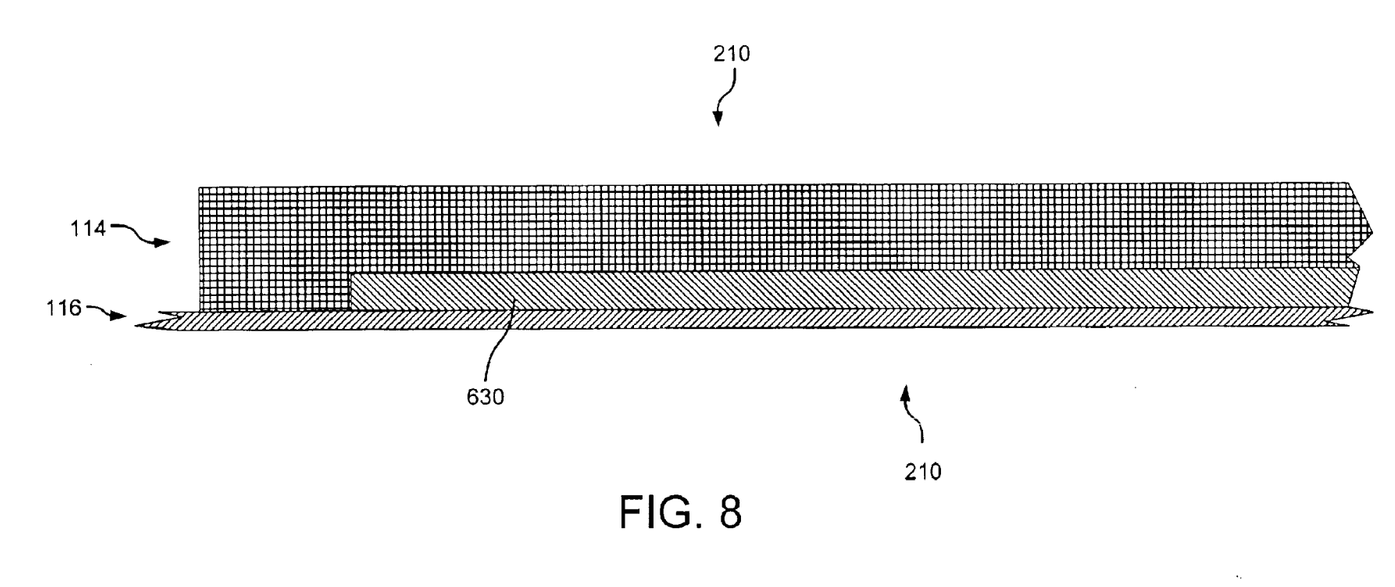
FIG. 8 is a sectional view taken along line 8—8 of FIG. 7.

An alternative embodiment is illustrated in FIGS. 6–8. Referring to FIGS. 6–7, the load beam 116 includes a distal end 606 supporting the head 118 and an opposing proximal end 608 that is secured to the distal end 210 of the actuator arm 114. The proximal end 608 defines a pair of transversely spaced alignment holes 618. The load beam 116 is preferably a stainless steel load beam.

The distal end 210 of the actuator arm 114 preferably includes a centrally located mounting member or pad 630, which is preferably rectangular. Ground traces 634 are formed in the distal end 210 of the circuit board actuator arm 114, connecting the pad 630 to ground vias 636 located proximally from the mounting pad 630. The ground vias 636 are grounded by way of connections within the circuit board actuator arm 114. Thus, static electricity that builds up on the head 118 drains through the load beam 116, the ground traces 634, the ground vias 636 and through other connections and traces of the circuit board actuator arm 114. The distal end 210 of the actuator arm 114 preferably defines a pair of centrally located actuator arm alignment holes 640. The actuator arm 114 can be manufactured according to known methods of manufacturing circuit boards. Thus, the materials used for the actuator arm 114 are preferably standard printed circuit board materials. The body of the actuator arm 114 is preferably made of reinforced fiberglass or plastic. The various components, such as the pad 630 can be formed during the printed circuit board manufacturing process. The pad 630 is preferably formed of copper, nickel plated copper, or some other material that is conventionally used in circuit board manufacturing processes. Many other possible pad and alignment hole configurations can be used in accordance with the present invention.

The pad 630 is preferably larger than the pads 330, 332 of the embodiment described above so that the pad 630 can absorb heat from spot welding without a large overall rise in temperature. Four spot weld connections 650 form a rectangular pattern and secure the proximal end 608 of the load beam 116 to the pad 630, and thus to the distal end 210 of the actuator arm 114. The head gimbal assembly 113 can be secured to the actuator arm 114 by positioning the load beam 116 so that the proximal end 608 abuts the pad 630 of the actuator arm 114 and the load beam alignment holes 618 are aligned with the actuator arm alignment holes 640. Then the load beam 116 is spot welded to the mounting pad 630 and thereby secured to the distal end 210 of the actuator arm 114. The spot weld connections 650 are preferably formed by laser spot welding, although resistance spot welding can also be used.

An embodiment of the present invention may be summarized as an actuator assembly (such as 110) that includes a rotatable actuator arm (such as 114) mounted on the base of a disc drive (such as 100). The actuator arm includes a metallic member (such as 330, 332, 630) seated on a non-metallic body. A proximal end (such as 608 or 220) of a load beam (such as 116) is mounted on the actuator arm and a distal end (such as 222 or 606) of the load beam supports a head (such as 118). The actuator assembly also includes a connection (such as 350, 352, or 650) between the metallic member and the load beam that secures the load beam to the actuator arm.

The load beam preferably includes a metallic material. The non-metallic body preferably includes a circuit board, and preferably includes a material selected from a group consisting of fiberglass and polymer.

The connection may be a solder connection (such as 350 or 352). In such an embodiment, the load beam preferably includes a tab (such as 310 or 312), and the connection secures the tab to the metallic member. The load beam preferably includes a stainless steel body (such as 318) and a solderable plating (such as 320) covering at least a portion of the stainless steel body.

Alternatively, the connection may be a weld connection (such as 650), and a body of the load beam may include stainless steel. The metallic member preferably includes copper, which is preferably nickel plated.

An embodiment of the present invention may alternatively be described as a disc drive (such as 100) that includes an actuator assembly (such as 110). The actuator assembly includes a rotatable actuator arm (such as 114) that includes a circuit board (such as 114) and a metallic pad (such as 330, 332, or 630) formed on a distal end (such as 210) of the circuit board. A metallic load beam (such as 116) includes a proximal end (such as 220 or 608) mounted on the distal end of the circuit board and a distal end (such as 222 or 606) supporting a head (such as 118). The actuator assembly further includes a metallic connection (such as 350, 352, or 650) between the metallic pad and the load beam, the connection securing the load beam to the actuator arm.

In an embodiment wherein the connection is a solder connection (such as 350 or 352), a tab (such as 310 or 312) of the load beam may include a stainless steel body (such as 318) and a solderable plating material (such as 320) covering at least a portion of the stainless steel body. The plating material is preferably selected from a group consisting of tin-lead, tin-lead-copper, silver-tin-copper, and gold. Additionally, the load beam may define a thermal relief aperture (such as 314 or 316) adjacent the at least one tab.

Alternatively, the connection may be a weld connection (such as 650), which is preferably a spot-weld connection.

An embodiment of the present invention may alternatively be summarized as a disc drive (such as 100) including an actuator assembly (such as 110). The actuator assembly includes a rotatable actuator arm (such as 114) including a non-metallic body and a metallic pad (such as 330, 332, or 630) formed on the non-metallic body, and means for securing the load beam to the metallic pad. The means for securing may include a solder connection (such as 350, 352). Alternatively, the means for securing may include a weld connection (such as 650).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, many different pad, tab, and alignment hole configurations can be used in accordance with the present invention. Numerous other changes may be made which will readily suggest themselves to those skilled in the art and which are encompassed in the spirit of the invention disclosed and as defined in the appended claims.

What is claimed is:

1. In a disc drive comprising a rotatable disc mounted on a base, an actuator assembly comprising:

a rotatable actuator arm mounted on the base, the actuator arm comprising a non-metallic body and a metallic member seated on the non-metallic body;

a load beam comprising a proximal end having one or more metallic members and a distal end supporting a head; and one or more metallic connections between the arm metallic member and the one or more metallic members on the load beam, the load beam being secured to the actuator arm solely by the metallic connections, wherein the metallic connections are one of a solder connection and a weld connection.

2. The actuator assembly of claim 1, wherein the load beam comprises a metallic material.

3. The actuator assembly of claim 1, wherein the non-metallic body comprises a circuit board.

4. The actuator assembly of claim 1, wherein the non-metallic body comprises a material selected from a group consisting of fiberglass and polymer.

5. The actuator assembly of claim 1, wherein the metallic connection is a solder connection.

6. The actuator assembly of claim 5, wherein the load beam comprises a tab, and wherein the solder connection fixedly secures the tab to the metallic member on the actuator arm.

7. The actuator assembly of claim 5, wherein the load beam comprises a stainless steel body and a solderable plating covering at least a portion of the stainless steel body.

8. The actuator assembly of claim 1, wherein the metallic connection is a weld connection.

9. The actuator assembly of claim 8, wherein a body of the load beam comprises stainless steel.

10. The actuator assembly of claim 1, wherein the metallic member on the actuator arm comprises copper.

11. The actuator assembly of claim 10, wherein the metallic member on the actuator arm comprises nickel plated copper.

12. A disc drive comprising a rotatable disc and an actuator assembly operable to move a head over the rotatable disc, the actuator assembly comprising:

a rotatable actuator arm comprising a circuit board and a metallic pad formed on a distal end of the circuit board;

a metallic load beam comprising a proximal end mounted on the distal end of the circuit board and a distal end supporting the head; and one or more metallic connections between the metallic pad and the load beam, the load beam being secured to the to the actuator arm solely by the metallic connections, wherein the metallic connections are one of a solder connection and a weld connection.

13. The actuator assembly of claim 12, wherein the circuit board comprises a material selected from the group consisting of fiberglass and polymer.

14. The actuator assembly of claim 12, wherein the connection is a solder connection.

15. The actuator assembly of claim 14, wherein the load beam comprises a tab, and wherein the solder connection fixedly secures the tab to the metallic pad.

16. The actuator assembly of claim 15, wherein the tab comprises a stainless steel body and a solderable plating material covering at least a portion of the stainless steel body.

17. The actuator assembly of claim 16, wherein the plating material is selected from a group consisting of tin-lead, tin-lead-copper, silver-tin-copper, and gold.

18. The actuator assembly of claim 15, wherein the load beam defines a thermal relief aperture adjacent the at least one tab.

19. The actuator assembly of claim 12, wherein the load beam comprises stainless steel and the connection is a weld connection.

20. The actuator assembly of claim 19, wherein the weld connection is a spot-weld connection.

21. The actuator assembly of claim 19, wherein the metallic pad comprises a copper material.

22. The actuator assembly of claim 21, wherein the metallic pad comprises nickel plated copper.

23. A disc drive comprising a rotatable disc and an actuator assembly operable to move a head over the rotatable disc, the head mounted on a load beam, the actuator assembly comprising:

a rotatable actuator arm comprising a non-metallic body and a metallic pad formed on the non-metallic body; and means for fixedly securing a metallic portion of the load beam to the metallic pad.

24. The disc drive of claim 23, wherein the means for fixedly securing comprises a solder connection.

25. The disc drive of claim 24, wherein the load beam comprises stainless steel and has a metallic plated portion, the solder connection fixedly connecting the metallic plated portion to the metallic pad.

26. The disc drive of claim 23, wherein the means for fixedly securing comprises a weld connection.

27. The disc drive of claim 26, wherein the load beam comprises stainless steel.

28. The disc drive of claim 23, wherein the non-metallic body comprises a circuit board.

\* \* \* \* \*